US005635906A

United States Patent [19]

Joseph

[11] Patent Number: 5,635,906
[45] Date of Patent: Jun. 3, 1997

[54] RETAIL STORE SECURITY APPARATUS

[76] Inventor: Joseph Joseph, 470 Kent Ave., Brooklyn, N.Y. 11211

[21] Appl. No.: 582,949

[22] Filed: Jan. 4, 1996

[51] Int. Cl.$^6$ ............................................. G08B 13/187
[52] U.S. Cl. .................. 340/572; 177/4; 177/5; 177/45; 177/264; 186/61; 235/383; 340/825.35
[58] Field of Search ................ 340/572, 825.35; 364/466, 405; 235/383; 186/61; 177/4, 5, 12, 45, 50, 264

[56]     References Cited

U.S. PATENT DOCUMENTS

| | | | |
|---|---|---|---|
| 2,919,851 | 1/1960 | Otis | 235/383 |
| 3,716,697 | 2/1973 | Weir | 235/383 |
| 3,749,191 | 7/1973 | Ashen et al. | 177/1 |
| 4,373,133 | 2/1983 | Clyne et al. | 235/383 |
| 4,583,083 | 4/1986 | Bogasky | 340/572 |
| 4,661,908 | 4/1987 | Hamano et al. | 364/405 |
| 4,676,343 | 6/1987 | Humble et al. | 340/572 |
| 4,779,706 | 10/1988 | Mergenthaler | 186/61 |
| 4,787,467 | 11/1988 | Johnson | 177/50 |
| 4,792,018 | 12/1988 | Humble et al. | 186/61 |
| 4,964,053 | 10/1990 | Humble | 364/466 |
| 5,125,465 | 6/1992 | Schneider | 177/50 |
| 5,375,680 | 12/1994 | Ikeda et al. | 186/61 |
| 5,378,860 | 1/1995 | Dingfelder et al. | 177/25.19 |
| 5,426,282 | 6/1995 | Humble | 235/383 |

*Primary Examiner*—Glen Swann
*Attorney, Agent, or Firm*—David M. Klein; Bryan Cave LLP

[57]     ABSTRACT

A security apparatus for a retail store in which each item for sale has a security tag attached thereto. A computerized database stores the approximate weight of each item for sale. During a purchase transaction, a predicted total weight of the items purchased is calculated and the items are placed in a bag or bags. A security station positioned near the exit of the store includes a scale for determining the actual total weight of a bag or bags containing the items purchased; a computer controller for comparing the actual total weight of the bag or bags with the predicted total weight and for generating a notification signal when the actual total weight is not within a predetermined range of the predicted total weight; and a deactivation pad for deactivating the security tags during weighing of the bag or bags. A security tag detection apparatus is positioned between the security station and the exit. The computer controller may activate the deactivating pad only when the actual total weight is within the predetermined range. An invoice number is preferably placed on the invoice as a bar code and the security station includes a bar code reader for reading the bar code from the invoice. A security method for a retail store is also provided.

13 Claims, 5 Drawing Sheets

RETAIL STORE SECURITY APPARATUS

BACKGROUND OF THE INVENTION

1. Field of the Invention

The present invention relates generally to a security apparatus for a retail store or the like, and more particularly to a security apparatus located near the exit of a retail store that is used to prevent shoplifting. The security apparatus verifies that the weight of items purchased in a store corresponds to the amount of weight in the bags containing the purchases, and simultaneously disables the security tags on the items in the bags.

2. Description of the Related Art

Shoplifting is a major problem for retail stores, resulting in the loss of millions of dollars each year. The most common type of shoplifting is that in which the shoplifter removes the shoplifted item from a store by wearing the item or by hiding the item on their person or in their bags. One well-known system developed to reduce this type of shoplifting involves attaching a security tag to all or most of the items in the store. The security tag contains a circuit or other means that interacts with a detection system located near the exit of the store. The detection system sounds an alarm if an item passes therethrough with a security tag that has not been deactivated. This type of security tag is typically deactivated or removed by a cashier when the item is purchased. The tag is usually deactivated by being passed over an electromagnetic apparatus.

One shortcoming of this type of security system is that if a store cashier is acting in concert with the shoplifter, the cashier may deactivate or remove the security tags without accepting payment for the items. Typically, the shoplifter will bring a number of purchases to the cashier, who will ring up less than all of the purchases, often discounting the prices on the purchased items. The cashier will then place the remaining unpurchased items in the shoplifter's bags. Prior to placing the items in the bags, the cashier will deactivate the security tags on the stolen items so that they will not be detected by the security detection apparatus near the exit of the store. If a cashier is acting in concert with a shoplifter, it is possible to steal a very large number of items with relative ease.

One technique used to reduce this type of shoplifting is to have a security guard stationed near the exit of the store to review each store receipt, and the content of the bags associated therewith, prior to each purchaser leaving the store. While this type of review acts as a deterrent to shoplifters, it is not particularly effective at reducing shoplifting because the review by the guards is often cursory, and it is difficult to monitor the extent to which the security guards are reviewing the purchases.

Accordingly, it would be desirable to have a security system to detect/prevent the type of shoplifting in which a cashier places unpaid for items in a bag with legitimate purchases. Moreover, it would be desirable to have a check-out system in which the cashier does not deactivate the security tags. It would also be desirable to have a security system in which it may be determined whether and to what extent the security guard near the store exit is checking the bags that are leaving the store.

In the context of self-service stores, several systems have been developed by which the weight of the items purchased may be used to validate a purchase. Johnson, U.S. Pat. No. 4,787,467 relates to an apparatus for self-service check-out in which a scanner is used to read the Uniform Product Code ("UPC") from each item being purchased. The item is then placed in a receiving container which has a scale located therebelow, and the weight of the item in a computer memory based upon the UPC code is compared to the weight of the item being placed in the receiving container. The cumulative weight of items that are placed in the receiving container is calculated via the scale and the total is compared with the computer's cumulative weight total registered item by item. If the weights do not equal, an alarm will sound. The receiving container may also be taken to a cashier where it is weighed a final time to ensure that nothing has been added to the receiving container after all of the items have been totalled.

Mergenthaler, U.S. Pat. No. 4,779,706, relates to a self-service check-out station which allows a purchaser to scan coded labels on merchandise being purchased and to generate the weight of the items at a first check-out counter. The weight of each item of merchandise is compared to corresponding data stored in a computer memory. If the weight of the item is found to be valid, the combined weight of the purchased items is then determined. The purchaser takes the purchased merchandise items to a second check-out counter where the combined weight of the merchandise items is again generated and compared with the previously generated combined weight. If the combined weights are found to be valid, the check-out operation is completed.

Weir, U.S. Pat. No. 3,716,697, relates to a self-service store in which sales display fixtures are provided with means for sensing the weight of articles supported thereon. Card readers are associated with the fixtures to identify customers selecting articles therefrom. Data processing equipment scans the weight sensing means and the card readers while customers are shopping, and upon completion of the shopping provides each customer with a printed invoice of the article selected and the cost of the articles. Using a scale in the exit passage, the weight of each loaded shopping cart is compared to the total invoice weight of articles selected. If the scale weight of the articles in the cart exceeds the total weight of invoiced items, an attendant can check the contents of the cart.

All of these devices relate to systems that are applicable to self-service stores, which have problems entirely different from those in conventional retail stores. Moreover, none of these devices is applicable to prevent shoplifting in a conventional retail store in which a cashier is acting in concert with a shoplifter by placing unpaid-for items in a bag with actual purchases, and by deactivating the security tags on all of the items at the same time.

SUMMARY OF THE INVENTION

The present invention is a security apparatus for a retail store or the like. Each item for sale in the store has a security tag attached thereto. A computerized database stores the approximate weight of each item for sale in the store. During a purchase transaction, register means retrieves from the database the weight of each item being purchased and calculates a predicted total weight of the items purchased in that transaction. The purchased items are then sealed in a bag or bags. A security station is positioned near the exit of the retail store. The security station includes a scale for determining the actual total weight of a bag or bags containing the items purchased during a purchase transaction; means for comparing the actual total weight of the bag or bags with the predicted total weight and for generating a notification signal when the actual total weight is not within a predetermined range from the predicted total weight; and means for deactivating the security tags of the purchased items during weighing of the bag or bags. Finally, a security tag detection apparatus is positioned between the security station and the exit.

In a preferred embodiment of the invention, the means for comparing the actual total weight of the bag or bags with the predicted total weight is a computer controller, and the scale communicates the actual total weight to the computer controller. If desired, the computer controller activates the deactivating means only when the actual total weight is within the predetermined range of the predicted total weight for a transaction.

The register preferably generates an invoice containing an invoice number for each transaction and stores the predicted total weight for a transaction in relation to the invoice number. In this embodiment, the security station includes means for inputting the invoice number for a transaction, and means for retrieving the predicted total weight for the invoice number. The invoice number is preferably a bar code on the invoice, and the security station includes a bar code reader for reading the bar code from the invoice.

The means for deactivating the security tags is a deactivation pad positioned adjacent to the scale or on a weighing surface of the scale. A pair of deactivation pads may be positioned on opposite sides of a weighing surface of the scale.

A security method for a retail store includes the steps of:
storing the approximate weight of each item for sale in the retail store;
retrieving the weight of individual items purchased during a purchase transaction and calculating a predicted total weight of the items purchased in that transaction;
placing the items purchased during a transaction in a bag or bags; and
for each purchase transaction, prior to the bag or bags leaving the retail store,
  a. determining the actual total weight of the bag or bags containing the items purchased during a purchase transaction;
  b. comparing the actual total weight of the bag or bags with the predicted total weight and generating a notification signal when the actual total weight is not within a predetermined range of the predicted total weight for a transaction;
  c. deactivating the security tags of the purchased items during weighing of the bag or bags; and
  d. detecting non-deactivated security tags immediately adjacent to the exit.

DETAILED DESCRIPTION OF THE INVENTION

Figure 1:
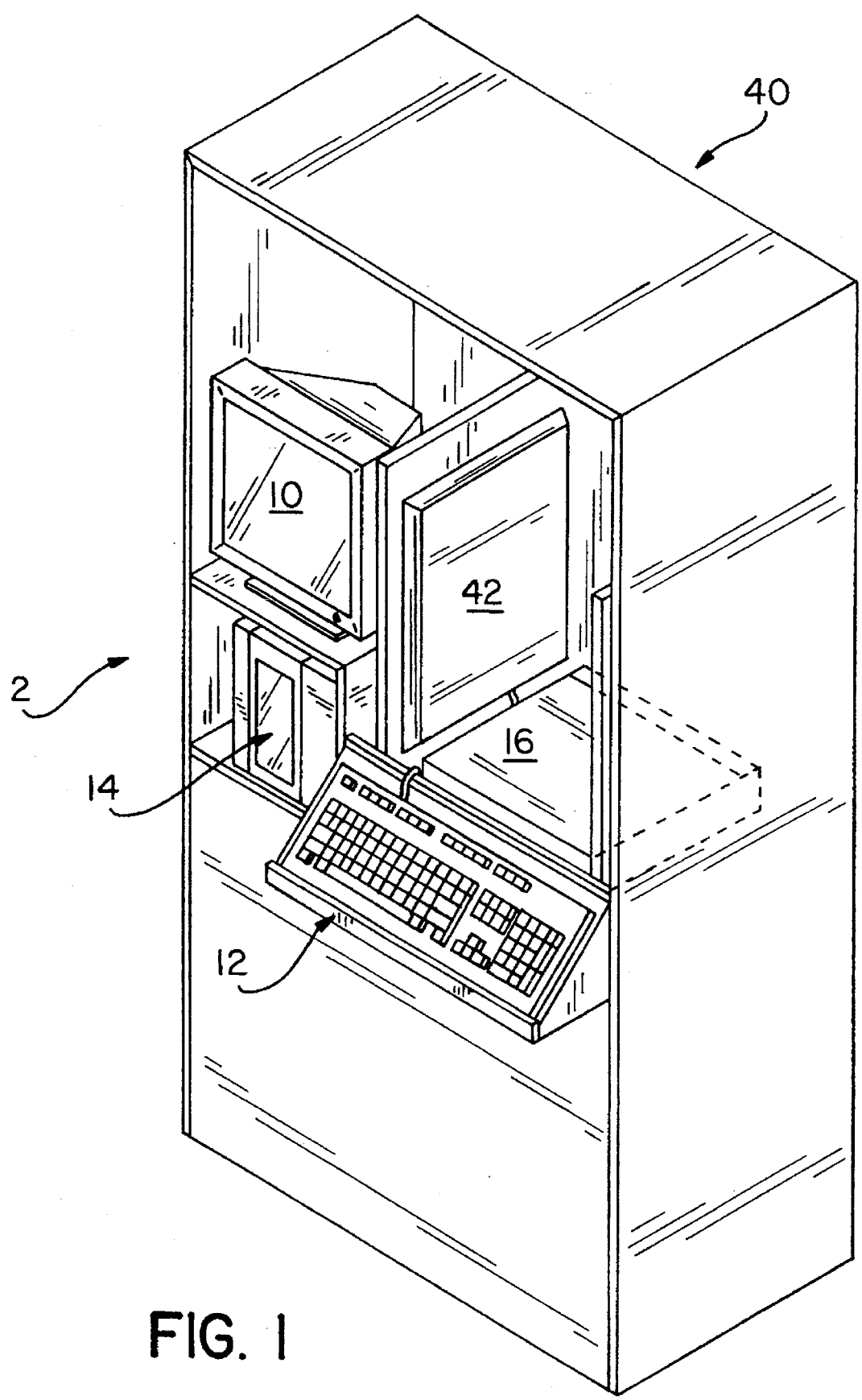
FIG. 1 is a perspective view of a security station according to the present invention.
Figure 2:
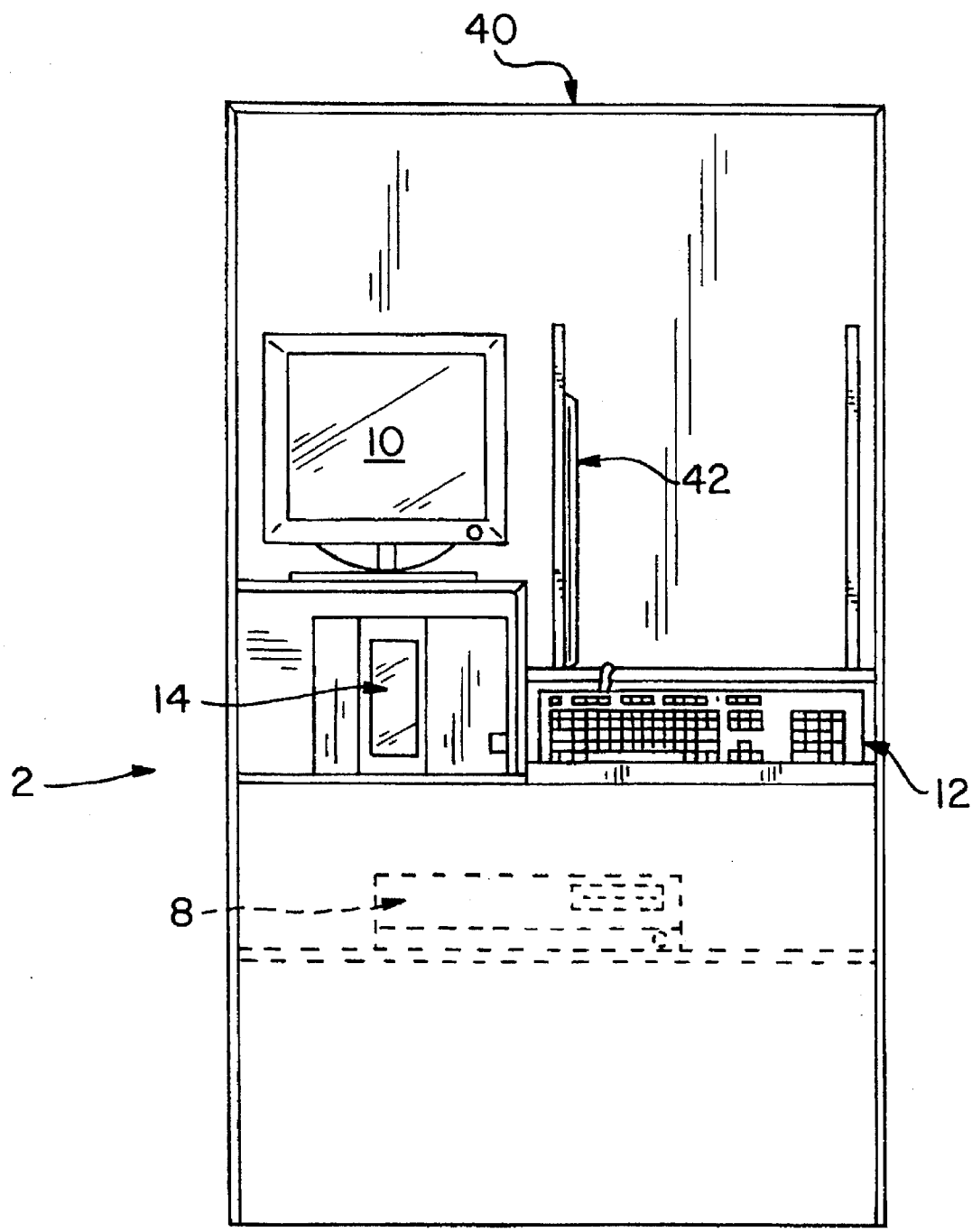
FIG. 2 is a front view of a security station according to the present invention.
Figure 3:
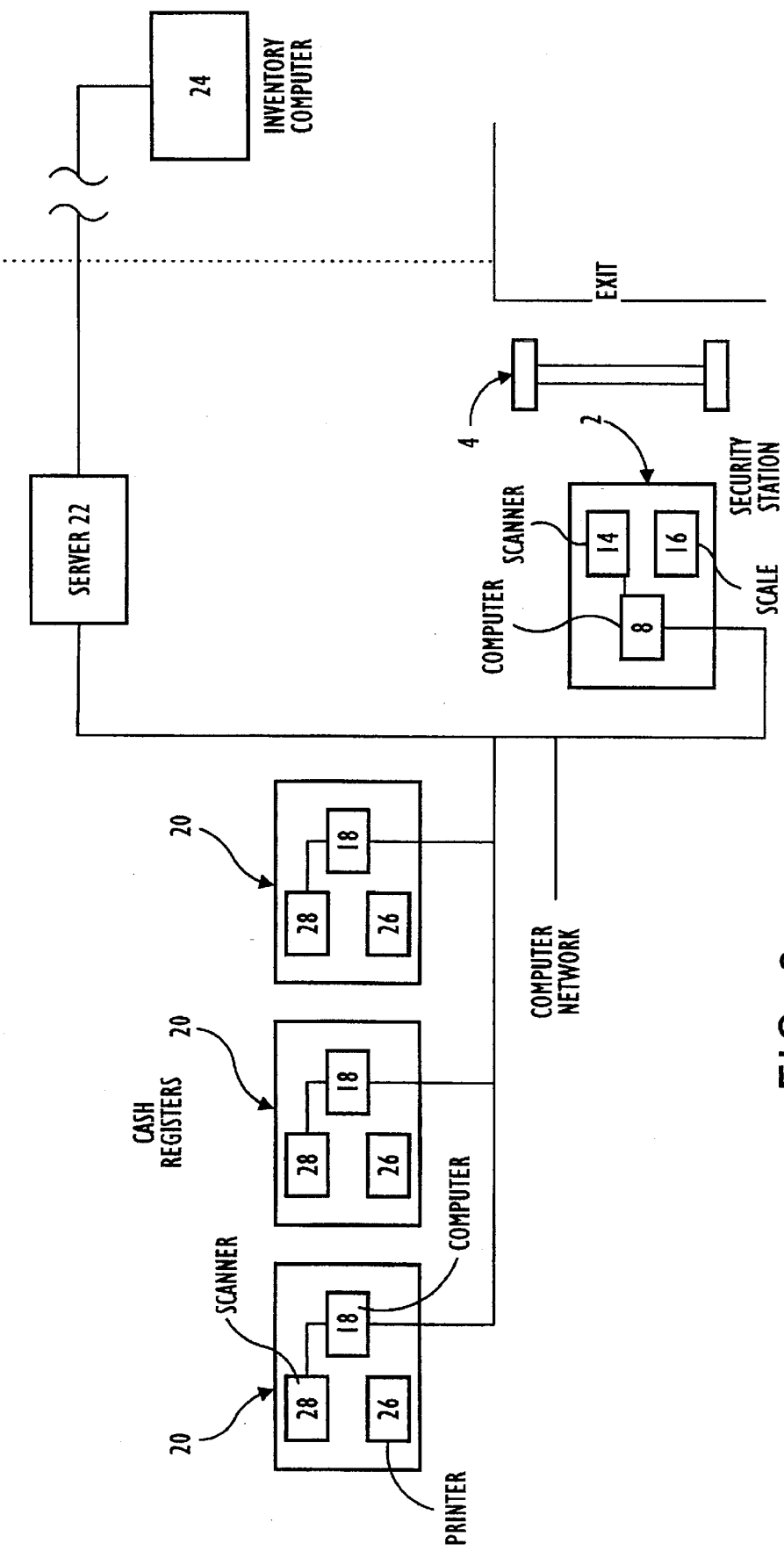
FIG. 3 is a schematic of a retail store incorporating the present security apparatus.

As shown in FIGS. 1–3, the present invention is a security station for preventing theft of merchandise from retail stores or the like. The security apparatus 2 is preferably located adjacent to the exit of the retail store. A security tag detection apparatus 4 is positioned between the security apparatus 2 and the exit of the store. Security station 2 generally includes a computer controller 8, including a monitor 10 and a keyboard 12; a bar code scanner 14; a scale 16; a security tag deactivation pad 42; and a housing 40, the shape of which is generally not material to the present invention.

Computer 8 is preferably an IBM-compatible personal computer operating MS-DOS. It is foreseen that computer 8 may be replaced by any applicable computer including a custom controller, or even a dumb terminal connected to a server, provided that the computer performs the functions described below. Monitor 10 is preferably a conventional color computer monitor, but may be replaced by any applicable display. It is foreseen that the security station may operate without a monitor per se, but rather with a more limited output device, such as flashing lights, if desired. Likewise, keyboard 12 may be replaced by a more limited data-input device, if desired.

Computer controller 8 is preferably on a Novell network in communication with a server computer 22. Server 22 is preferably located in the retail store, but remote from the sales floor, and provides a centralized database and control functions for the Novell network. Server 22 may communicate with an inventory computer 24 located at a warehouse or the like, if desired. Also preferably on the store Novell network are cash register 20, each of which is also preferably an IBM PC compatible computer 18. Each cash register 20 is also equipped with a printer 26 for printing invoices, and a scanner 28.

As previously mentioned, security station 2 is equipped with a bar code scanner 14. Bar code scanner 14 is preferably a projection scanner such as the Metrologic™ MS700 or the Symbol Technologies™ LS9100. Scanner 14 may, however, be any appropriate scanner for reading a bar code on invoices presented at the security station. Scanner 14 preferably communicates the scanned information to the RS-232 serial port of computer 8. Computer 8 is equipped with appropriate software for receiving the scanned information as serial data.

Security station 2 is also equipped with an electronic scale 16. Scale 16 is a conventional weighing scale such as the Pennsylvania Scale™ 7X00 Series. Scale 16 preferably communicates weight information for items placed on the scale to computer 8 also by means of an RS-232 serial connection. It is foreseen that computer 8, scanner 14, and scale 16 may be integrated together into a customized security station or may be utilized as interconnected discrete devices as discussed herein.

Each item for sale in the retail store includes a bar code on the price tag. Encoded on the bar code is preferably a twelve-digit number, of which the first seven numbers represent the product number or SKU for the item, the next two digits represent a color code for the item, the next two digits represent a size code for the item, and the final digit is used as a checksum.

Resident on the server computer 22, is a database which is preferably programmed in FoxPro, v. 2.5, that includes a number of interrelated databases. While these databases will be described in detail below, the structure of the overall database is not intended to limit the scope of the invention. It is foreseen that databases having different structures could be implemented which perform the same functions as those described herein. It will be appreciated that in addition to the database fields described below, each database may contain other fields which are not accessed by or otherwise pertinent to the security system of the invention.

A PRODUCT database includes the following fields: A Product Number or SKU field (seven-digit character), a DESCRIPTION field (thirty-digit character) which contains a description of the item, a PRICE field (eight-digit numeric) containing a price for the item, and WEIGHT00 . . . WEIGHT14 fields (six-digit numeric), wherein 00 . . . 14 represent the fifteen sizes that are available on the system, which contain the approximate weight for each size of each item in the store. It will be appreciated that the sizes 00 . . . 14 are not literal sizes, but are simply the size names applied to the fifteen sizes that the database structure is designed to handle. The actual sizes that correspond to the sizes 00 . . . 14 may be determined from a separate look-up table.

An INVOICE database contains data for each invoice generated at the cash registers. The INVOICE database includes the following fields: An INVOICE NO. field (twenty-six digit character), a TOTAL WEIGHT field (six digit numeric) which contains the total weight of all the items on the invoice, and SCAN COUNT fields, the purpose of which will be discussed in detail below. In addition, the INVOICE database contains other fields, such as the total price of the purchases on the invoice, method of payment, etc., which are not accessed by the security system of the invention.

An INVOICE ITEM database maintains a record of each item on each invoice. This database includes the following fields: INVOICE NO. field, which is keyed to the INVOICE NO. field of the INVOICE database, a FULL SKU field which contains the full twelve-digit code read from the item label for each item on the invoice, a UNIT PRICE field which contains the price for each item sold on each invoice, and a WEIGHT field which contains the weight of each item on the invoice. The INVOICE ITEM database also contains other fields which are not accessed by the security system of the invention.

Prior to placing new items on the sales floor, each size of each item is weighed and the weight of the item is stored in the PRODUCT database. As discussed in more detail below, in order to reduce the false alarm rate of the system, some range of weight variation is built into the system, whether into the weights of individual items or into the total weight of items purchased during a transaction. In practice therefore, it may not be necessary to weigh each individual size of each item. Rather, every other size may be weighed, for example, and the weight of the intermediate sizes extrapolated therefrom.

Figure 4:
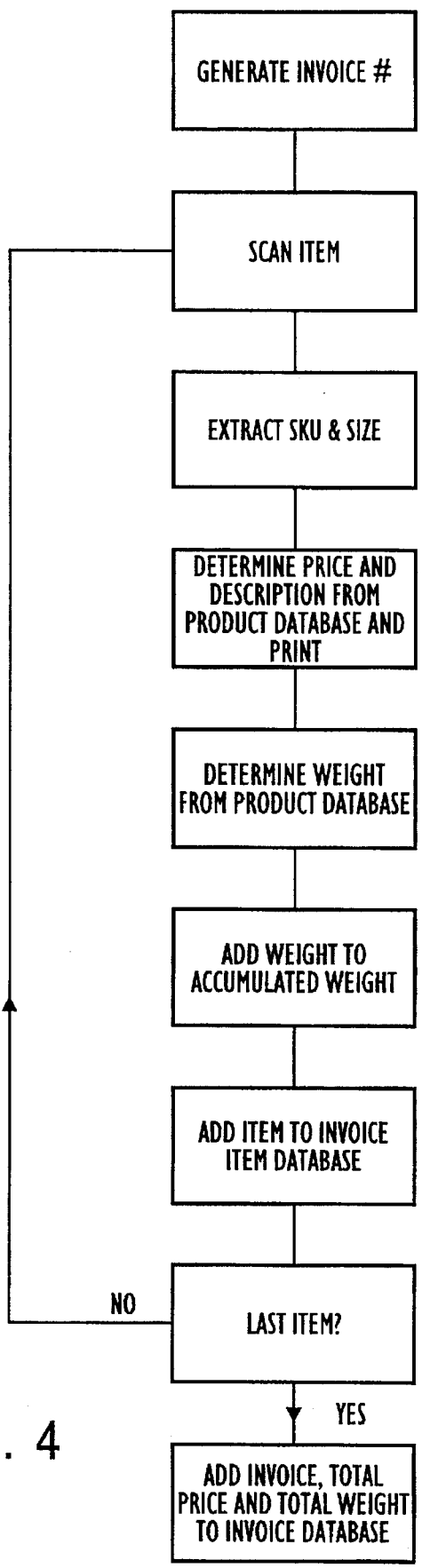
FIG. 4 is a flow diagram showing operation of the security apparatus at the cash register.
Figure 5:
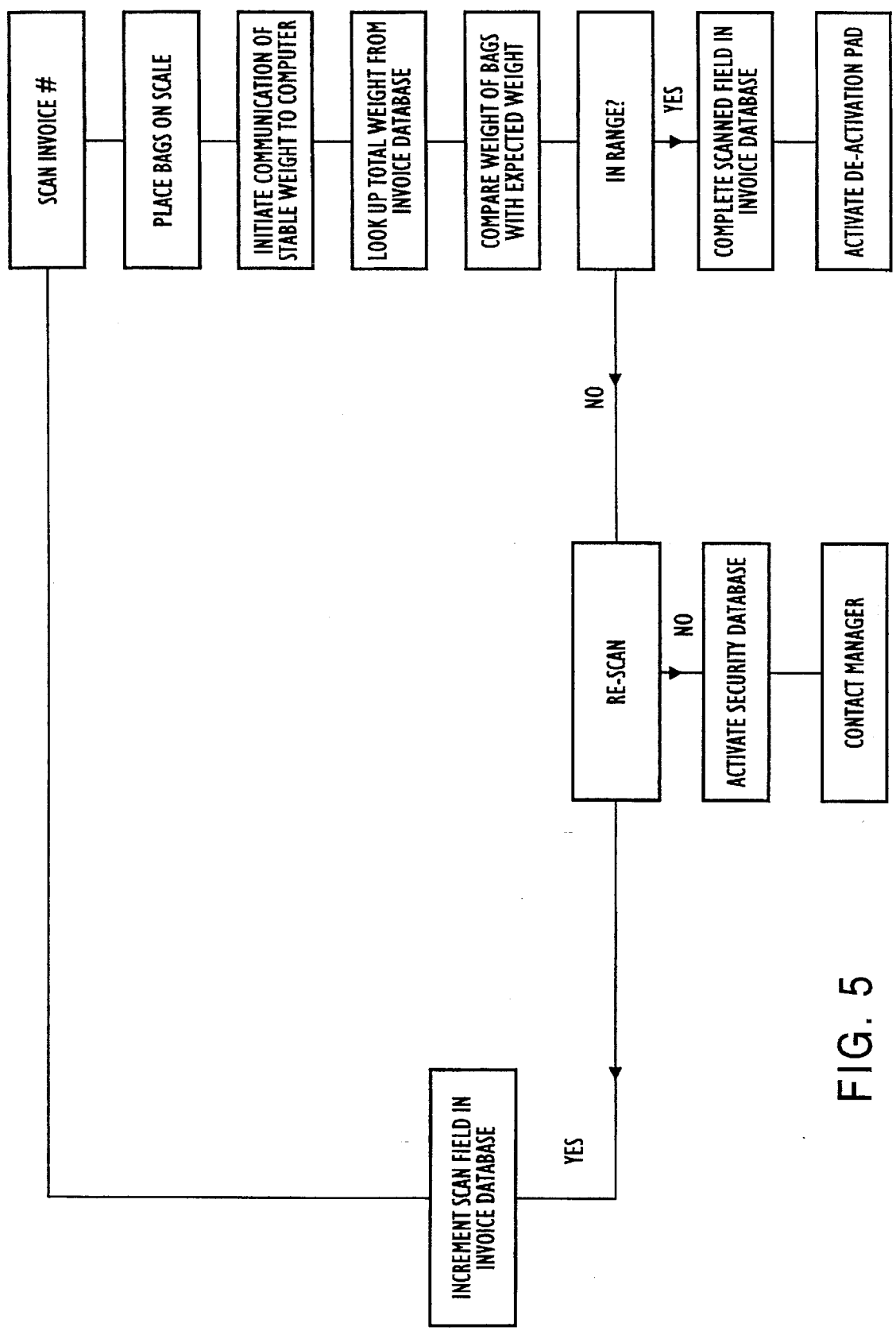
FIG. 5 is a flow diagram showing operation of the security apparatus at the security station.

As shown in FIGS. 4–5, the invention will now be described with respect to the operation thereof. Once a customer has selected goods to purchase, the goods are be brought to a cash register 20. As previously mentioned, each cash register 20 is equipped with a networked computer 18, a printer 26, and a scanner 28. For each item to be purchased, the cashier scans the item label and scanner 28 reads the twelve-digit bar code on the item label. The system assigns an invoice number to the purchase. Using the seven-digit SKU number from the item label, the system accesses the PRODUCT database to determine a DESCRIPTION and PRICE for the item. These are printed on the invoice by printer 26. In addition, the system determines the weight for the item being purchased from the PRODUCT database. This weight is added to an ACCUMULATED WEIGHT variable that is contained in the computer's memory. The INVOICE ITEM database is then updated to include the INVOICE NO., SKU, UNIT PRICE, QUANTITY and other information for the item purchased. This procedure is repeated for each item being purchased so that when all of the items to be purchased have been scanned, these will be included under the appropriate INVOICE NO. in the INVOICE ITEM database, and the ACCUMULATED WEIGHT variable will contain the total weight for the order.

When the purchase is completed, i.e., when payment is accepted by the cashier, the INVOICE database is updated with the INVOICE NO., TOTAL PRICE, TOTAL WEIGHT and other information for the invoice. Printer 26 prints on the invoice a bar code that includes the INVOICE NO. At this point, the cashier places all of the purchased items in a bag, and the invoice, with the bar code exposed, is stapled to the outside of the bag. If multiple bags are in use, the invoice is stapled to the outside of any one of the bags.

Each item in the store is equipped with a security tag of the type well known in the art in which the security tag must be passed over a deactivation pad in order to be deactivated. In a preferred embodiment, the security tags are those that may be deactivated using the Checkpoint Systems, Inc.™ Counterpoint™ IV Deactivation Pad. Normally, these tags are individually deactivated by the cashier at a cash register. In the present invention, all of the tags are left activated as they are placed in the bag.

The customer takes the bag or bags containing their purchases to the security station 2 located near the exit of the store. Using scanner 14, the security guard scans the bar code on the bags. The bag or bags are then placed on scale 16. Once the scale has an opportunity to settle, which usually occurs in less than one second, the security guard actuates a key on the keyboard or scale which causes the weight reading from scale 16 to be transmitted to computer 8. With the INVOICE NO. read by scanner 14, computer 8 accesses the INVOICE database to determine the TOTAL WEIGHT for the purchase. The computer compares the weight on scale 16 with the TOTAL WEIGHT for the purchase. If the weight read by the scale is within a predetermined range of the TOTAL WEIGHT for the INVOICE NO., the INVOICE database will be updated so that the SCAN COUNT field is incremented to show that the invoice has been scanned. While the bags are being weighed on scale 16, security tag deactivation pad 42, which is preferably the aforementioned Checkpoint Systems, Inc.™ Counterpoint™ IV Deactivation Pad, emits a signal of sufficient strength to deactivate the security tags on the items within the bags. Thus, the security apparatus of the invention simultaneously checks the weight of the bags to ensure that shoplifting has not occurred, and deactivates the security tags.

If the weight read by the scale is outside of the range for the TOTAL WEIGHT of the invoice, the security guard may re-scan the invoice and repeat the weighing procedure. Each time the invoice is scanned, however, the SCAN COUNT field in the INVOICE database is incremented. This feature helps to prevent shoplifting of the type in which the security guard is involved and in which items are added to and removed from the bags in an attempt to place the weight of the bags in the required range. If a particular security guard has too high a scan count in too many instances, this will lead the store manager to more carefully observe that particular security guard for possibly assisting in shoplifting.

In a preferred embodiment, the predetermined range by which the actual weight of the purchasers bags may differ from the predicted total weight for the items purchased will be based on a percentage of the total weight. For example, it is preferred that the actual weight may exceed the predicted weight by 25% of the predicted weight, and may be 50% lower than the predicted weight. Obviously, different ranges may be used, if desired. Also, a weight range may be built into the PRODUCT database for each item, and the weight range may be accumulated by a second variable, if desired. Other variations for maintaining a low false alarm rate while still preventing shoplifting may be implemented as well.

Normally, if the actual weight of a customer's bags exceed their expected weight, and if the error cannot be corrected by re-scanning the bags, a SECURITY database will be initiated. The SECURITY database includes the following fields: An EMPLOYEE I.D. NO. field for the security guard, an INVOICE NO. field, a WEIGHT DIFFERENCE field, a CHECKED BY MANAGER field, and a NOTES field. Once the SECURITY database has been initiated, the EMPLOYEE I.D., INVOICE NO., and WEIGHT DIFFERENCE fields will automatically be entered by computer 8, and the security guard will page a manager. The bags in question may then be placed on the side until a manager arrives, and the security guard can continue scanning other customers' bags. When the customer's bags have been checked by the manager, the CHECKED BY MANAGER field in the SECURITY database may be set to "Yes" by the manager. The manager may also enter notes in the NOTES field. Obviously, levels of security are implemented in the system so that the CHECKED BY MANAGER field cannot be accessed by non-managerial employees. Generally speaking, when the security database is accessed by the manager, only those invoices for which the CHECKED BY MANAGER field have not been entered "Yes" will appear, to assist the manager in checking only those invoices with discrepancies.

Another feature of the invention is that the manager can access a list of all invoices in which the SCAN COUNT field of the INVOICE database is zero. In this manner, the manager may determine which and how many invoices have not been scanned to check the effectiveness of the security guards.

Between the security station and the exit is a security tag detector 4, of the type well known in the art, that detects any security tags that have not been deactivated. In the event that a security guard does not deactivate the security tags by means of deactivation pad 42, an alarm will sound as the customer passes through the security tag detector 4. Operation of the deactivation pad 42 may be controlled by computer 8 so that the deactivation pad is only activated once an invoice has been scanned, and the weight of the bags on the scale have been validated. In this manner, a security guard would be prevented from deactivating the detection tags without first scanning an invoice and validating the weight of the bags associated with that invoice.

Housing 40 of security station 2 is preferably constructed of a non-metallic material such as plastic or wood. More particularly, the vertical upstands that support deactivation pad 42 and maintain the bags on the scale surface, are preferably constructed of a non-metallic material, such as wood. It has been found that use of metal in the area surrounding deactivation pad 42 reduces the effectiveness of the deactivation pad in deactivating the security tags. It is foreseen that the system may employ multiple deactivation pads, if desired and that the pads may be mounted in different positions, such as horizontally, provided that the deactivation pad(s) is positioned to deactivate the security tags in bags that are placed on the scale 16.

Although the present invention has been described in detail with respect to certain embodiments and examples, variations and modifications exist which are within the scope of the present invention as defined in the following claims.

I claim:

1. A security apparatus for a retail store, the retail store having an exit and an inventory of items for sale, each item having a security tag attached thereto, the security apparatus comprising:

a database for storing the approximate weight of each item for sale;

register means for retrieving from the database the weight of individual items purchased during a purchase transaction and for calculating a predicted total weight of the items purchased in that transaction;

a security station positioned near the exit of the retail store, the security station comprising
   a) a scale for determining the actual total weight of a bag or bags containing the items purchased during a purchase transaction;
   b) means for comparing the actual total weight of the bag or bags with the predicted total weight and for generating a notification signal when the actual total weight is not within a predetermined range of the predicted total weight for a transaction; and
   c) means for deactivating the security tags of the purchased items during weighing of the bag or bags; and a security tag detection apparatus positioned between the security station and the exit.

2. The security apparatus according to claim 1 wherein the means for comparing the actual total weight with the predicted total weight only activates the deactivating means when the actual total weight is within the predetermined range of the predicted total weight for a transaction.

3. The security apparatus according to claim 1 wherein the register means generates an invoice containing an invoice number for each transaction, the register means further comprising means for storing the predicted total weight for a transaction in relation to the invoice number, the security station further comprising means for inputting the invoice number for a transaction, and means for retrieving the predicted total weight for the invoice number.

4. The security apparatus according to claim 3 wherein the invoice number is a bar code on the invoice, and wherein the security station further comprises bar code reader means for reading the bar code from the invoice.

5. The security apparatus according to claim 1 wherein the means for deactivating the security tags comprises a deactivation pad positioned adjacent to the scale.

6. The security apparatus according to claim 5 wherein the deactivation pad is located on a weighing surface of the scale.

7. The security apparatus according to claim 1 wherein the means for deactivating the security tags comprises a pair of deactivation pads positioned on opposite sides of a weighing surface of the scale.

8. The security apparatus according to claim 1 wherein the means for comparing the actual total weight of the bag or bags with the predicted total weight is a computer controller, and wherein the scale communicates the actual total weight to the computer controller.

9. The security apparatus according to claim 8 wherein the computer controller activates the deactivating means only when the actual total weight is within the predetermined range of the predicted total weight for a transaction.

10. A security method for a retail store, the retail store having an exit and an inventory of items for sale, each item having a security tag attached thereto, the security method comprising the steps of:

storing the approximate weight of each item for sale in the retail store;

retrieving the weight of individual items purchased during a purchase transaction and calculating a predicted total weight of the items purchased in that transaction;

placing the items purchased during a transaction in a bag or bags; and for each purchase transaction, prior to the bag or bags leaving the retail store,
   a) determining the actual total weight of the bag or bags containing the items purchased during a purchase transaction;
   b) comparing the actual total weight of the bag or bags with the predicted total weight and for generating a notification signal when the actual total weight is not within a predetermined range of the predicted total weight for a transaction; and
   c) deactivating the security tags of the purchased items during weighing of the bag or bags; and
   d) detecting non-deactivated security tags immediately adjacent to the exit.

11. The security method according to claim 10 further comprising the step of activating the deactivating means only when the actual total weight is within the predetermined range of the predicted total weight for a transaction.

12. The security method according to claim 10 further comprising the steps of generating an invoice containing an invoice number for each transaction and attaching the invoice to the bag or bags, storing the predicted total weight for a transaction in relation to the invoice number, and retrieving the predicted total weight based upon the invoice number.

13. The security method according to claim 12 wherein the invoice number is a bar code on the invoice.

* * * * *